United States Patent
Madhavan et al.

(10) Patent No.: US 8,265,193 B2
(45) Date of Patent: Sep. 11, 2012

(54) METHOD AND SYSTEM FOR COMMUNICATING DATA OVER A WIRELESS COMMUNICATION SYSTEM VOICE CHANNEL UTILIZING FRAME GAPS

(75) Inventors: Sethu K. Madhavan, Canton, MI (US); Fahd Z. Laghrari, Commerce Township, MI (US); James J. Piwowarski, Holly, MI (US)

(73) Assignee: General Motors LLC, Detroit, MI (US)

( * ) Notice: Subject to any disclaimer, the term of this patent is extended or adjusted under 35 U.S.C. 154(b) by 724 days.

(21) Appl. No.: 10/802,147

(22) Filed: Mar. 17, 2004

(65) Prior Publication Data
US 2005/0207511 A1 Sep. 22, 2005

(51) Int. Cl.
*H04L 27/10* (2006.01)
*H04L 23/00* (2006.01)

(52) U.S. Cl. ......................... 375/295; 375/303; 370/528

(58) Field of Classification Search ................. 375/295, 375/303, 309, 285, 296, 358, 219, 222, 271, 375/272, 302, 216, 217, 259, 377; 332/100; 455/68, 69, 701, 174.1, 194.1, 212, 218; 370/522, 528
See application file for complete search history.

(56) References Cited

U.S. PATENT DOCUMENTS

| | | | |
|---|---|---|---|
| 3,731,201 A | 5/1973 | Frisbie | |
| 4,499,339 A | 2/1985 | Richard | |
| 4,972,439 A * | 11/1990 | Kuznicki et al. | 375/296 |
| 5,617,478 A * | 4/1997 | Tagami et al. | 381/56 |
| 5,978,756 A * | 11/1999 | Walker et al. | 704/210 |
| 6,044,266 A * | 3/2000 | Kato | 455/422.1 |
| 6,122,271 A * | 9/2000 | McDonald et al. | 370/345 |
| 6,144,336 A | 11/2000 | Preston et al. | |
| 6,188,720 B1 * | 2/2001 | Batzer et al. | 375/222 |
| 6,212,238 B1 * | 4/2001 | Chambers | 375/259 |
| 6,226,605 B1 * | 5/2001 | Nejime et al. | 704/207 |
| 6,366,772 B1 * | 4/2002 | Arnson | 455/415 |
| 7,146,174 B2 * | 12/2006 | Gardner et al. | 455/453 |
| 7,151,768 B2 * | 12/2006 | Preston et al. | 370/350 |
| 7,206,305 B2 * | 4/2007 | Preston et al. | 370/352 |
| 7,239,859 B2 | 7/2007 | Madhavan et al. | |
| 7,260,221 B1 * | 8/2007 | Atsmon | 380/247 |
| 2002/0001317 A1 * | 1/2002 | Herring | 370/493 |
| 2002/0030874 A1 * | 3/2002 | Heidemann et al. | 359/152 |

(Continued)

OTHER PUBLICATIONS

Office Action from U.S. Appl. No. 10/722,260, U.S. Patent and Trademark Office, mailed Sep. 23, 2006, 5 pages.
Notice of Allowability containing Examiner's Statement of Reasons for Allowance from U.S. Appl. No. 10/722,260, U.S. Patent and Trademark Office, dated Mar. 1, 2007, 4 pages.
U.S. Appl. No. 12/876,443 entitled "Modem Signaling Using Speech Components Over a Voice Channel of a Wireless Communication System", filed Sep. 7, 2010, 18 pages.

(Continued)

*Primary Examiner* — Tesfaldet Bocure
(74) *Attorney, Agent, or Firm* — Anthony L. Simon; Reising Ethington P.C.

(57) ABSTRACT

The present invention provides a method for communicating data over a voice channel of a wireless communication system. The method includes receiving a first periodic data signal and modulating the first periodic data signal to produce a second periodic data signal. Modulating the first periodic data signal includes inserting a predetermined silence period into the first periodic data signal at timed intervals to produce the second periodic data signal. The method further includes communicating the second periodic data signal over the voice channel of the wireless communication system. The method of modulating the first periodic data signal may include receiving a control signal that includes parameters for a length of the predetermined silence period and timing of the intervals, modulating the first periodic data signal responsive to the received control signal, and producing the second periodic data signal.

23 Claims, 3 Drawing Sheets

U.S. PATENT DOCUMENTS

| | | | |
|---|---|---|---|
| 2003/0133439 A1* | 7/2003 | Huang et al. | 370/352 |
| 2003/0225574 A1* | 12/2003 | Matsuura et al. | 704/212 |
| 2004/0220803 A1* | 11/2004 | Chiu et al. | 704/214 |
| 2005/0013283 A1* | 1/2005 | Yoon et al. | 370/350 |
| 2005/0021332 A1* | 1/2005 | Ryu et al. | 704/233 |
| 2005/0113061 A1 | 5/2005 | Madhavan et al. | |

OTHER PUBLICATIONS

U.S. Appl. No. 12/901,841 entitled "Modem Signaling Using a Multitone Prefix Over a Voice Channel of a Wireless Communication System", filed Oct. 11, 2010, 20 pages.

* cited by examiner

METHOD AND SYSTEM FOR COMMUNICATING DATA OVER A WIRELESS COMMUNICATION SYSTEM VOICE CHANNEL UTILIZING FRAME GAPS

FIELD OF THE INVENTION

This invention relates generally to wireless communications. More specifically, the invention relates to a method and system for communicating data over a wireless communication system voice channel utilizing frame gaps.

BACKGROUND OF THE INVENTION

The opportunity to utilize wireless features is ever increasing as cellular transceivers are being transformed into entertainment as well as communication platforms. Typically, wireless systems within mobile vehicles (e.g., telematics units) provide voice communication. Recently, these wireless systems have been utilized to update systems within telematics units such as, for example, radio station presets. Such use requires transmission of data.

Cellular transceivers operate within communication systems, for example a telematics unit within a mobile vehicle operating within a mobile vehicle communication system (MVCS). Conventional MVCSs heretofore have operated utilizing analog signal technology. Recently, many MVCSs have upgraded to digital technology allowing the upgraded MVCS to operate more efficiently. Unfortunately, MVCSs utilizing digital technology have experienced some undesired effects such as, for example, the inability to effectively transmit data through a voice channel of a communication network due to a system vocoder completely attenuating the signal because the signal is interpreted as background noise.

The present invention advances the state of the art in cellular transceivers.

SUMMARY OF THE INVENTION

One aspect of the invention includes a method of communicating data over a voice channel of a wireless communication system. The method includes receiving a first periodic data signal and modulating the first periodic data signal to produce a second periodic data signal. The modulation includes inserting a predetermined silence period at timed intervals into the first periodic data signal to produce the second periodic data signal. The method further includes communicating the second periodic data signal over the voice channel of the wireless communication system.

In accordance with another aspect of the invention, a computer readable medium storing a computer program includes the following: computer readable code for directing the reception of a first periodic data signal; computer readable code for modulating the first periodic data signal to produce a second periodic data signal, wherein the modulation includes inserting a predetermined silence period at timed intervals into the first periodic data signal to produce the second periodic data signal; and computer readable code for communicating the second periodic data signal over the voice channel of the wireless communication system.

Yet another aspect in accordance with the present invention is a system for providing communication data over a voice channel of a wireless communication system. The system includes means for receiving a first periodic data signal; means for modulating the first periodic data signal to produce a second periodic data signal, wherein the modulation includes inserting a predetermined silence period at periodic intervals into the second periodic data signal; and means for communicating the second periodic data signal over the voice channel of the wireless communication system is also provided.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE DRAWINGS

Figure 1:
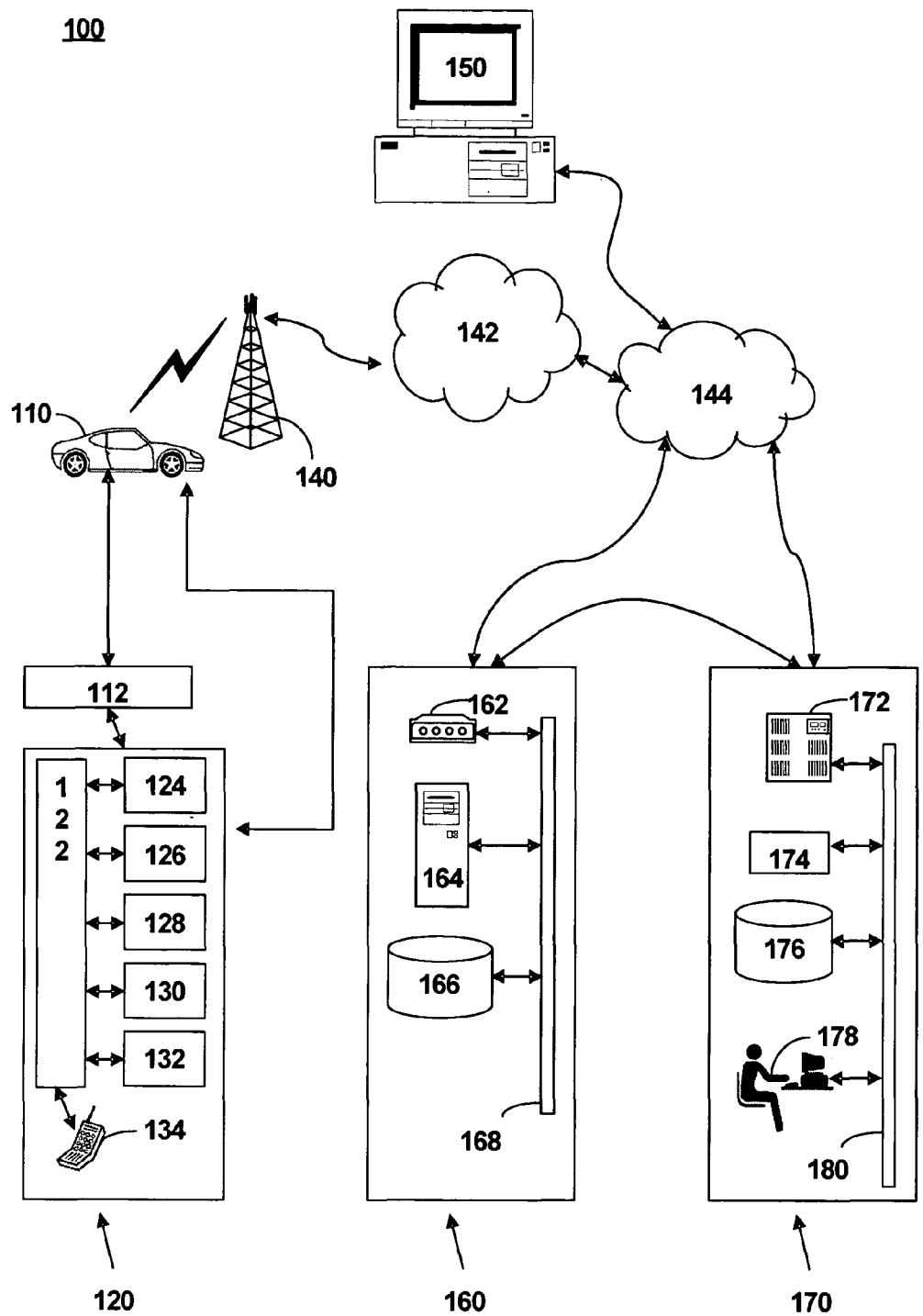
FIG. 1 illustrates one embodiment of a system for providing communication data over a voice channel of a wireless communication system, in accordance with the present invention.

FIG. 1 illustrates one embodiment of system for data transmission over a wireless communication system, in accordance with the present invention at 100. System 100 includes a mobile vehicle communication unit (MVCU) 110, a vehicle communication network 112, a telematics unit 120, one or more wireless carrier systems 140, one or more communication networks 142, one or more land networks 144, one or more client, personal, or user computers 150, one or more web-hosting portals 160, and one or more call centers 170. System 100 may include additional components not relevant to the present discussion.

In one embodiment, MVCU 110 is implemented as a mobile vehicle equipped with suitable hardware and software for transmitting and receiving voice and data communications. Therefore, MVCU 110 is also referred to as a mobile vehicle in the discussion below. In operation, MVCU 110 may be implemented as a motor vehicle, a marine vehicle, or an aircraft. Additionally, to practice the present invention in its simplest form, MVCU 110 can be implemented as a conventional cellular transceiver such as, for example, a cellular telephone. MVCU 110 may include additional components not relevant to the present discussion.

MVCU 110, via a vehicle communication network 112, sends signals to various units of equipment and systems within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends to and receives radio transmissions from wireless carrier system 140. Wireless carrier system 140 is implemented as any suitable system for transmitting a signal from MVCU 110 to communication network 142.

Telematics unit 120 includes a digital signal processor (DSP) 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 may be implemented without one or more of the above listed components, for example speakers 132. Telematics unit 120 may include additional components not relevant to the present discussion.

In one embodiment, DSP 122 is implemented as a microcontroller, controller, host processor, or vehicle communications processor. In an example, DSP 122 is implemented as an application specific integrated circuit (ASIC). In another embodiment, DSP 122 is implemented as a processor working in conjunction with a central processing unit (CPU) performing the function of a general purpose processor.

DSP 122 executes various computer programs that control programming and operational modes of electronic and mechanical systems within MVCU 110. DSP 122 controls communications (e.g., call signals) between telematics unit 120, wireless carrier system 140, and call center 170. In one embodiment, a voice-recognition application is installed in DSP 122 that can translate human voice input through microphone 130 to digital signals.

Figure 2:
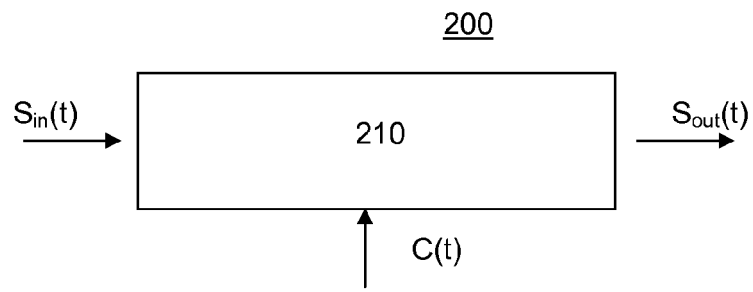
FIG. 2 is a block diagram illustrating a system for producing an altered protocol transmission, in accordance with the present invention.

DSP 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers such as, for example, data over voice channel communication. DSP 122 is capable of modulating a periodic data signal by inserting predetermined silence periods, also called frame gaps, into the signal to produce a second periodic data signal that is configured for transmission over a voice channel. FIG. 2, discussed below, illustrates a signal control device 210 for modulating a periodic data signal that is implemented as a digital signal processor. In the present embodiment, computer readable code for effecting modulation and transmitting the modulated signal is stored in in-vehicle memory 128.

GPS unit 126 provides longitude and latitude coordinates, as well as a time stamp, of the vehicle responsive to a GPS broadcast signal received from one or more GPS satellite broadcast systems (not shown). In-vehicle mobile phone 134 is a cellular-type phone such as, for example, a digital, dual-mode (e.g., analog and digital), dual-band, multi-mode or multi-band cellular phone.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Client computer 150 sends user preferences to web-hosting portal 160 through a web-page interface using communication standards such as hypertext transport protocol (HTTP), and transport-control protocol and Internet protocol (TCP/IP). In operation, a client utilizes computer 150 to initiate setting or re-setting of user preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that is then transferred to web server 164. Modem 162 may reside inside web server 164. Land network 144 transmits data communications between web-hosting portal 160 and call center 170.

Web server 164 receives user-preference data from client computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including communicating data over a voice channel of a wireless communication system utilizing frame gaps, carrying out an initial data link authentication process, enrollment services, navigation assistance, directory assistance, roadside assistance, business or residential assistance, information services assistance, emergency assistance, and communications assistance. In the present embodiment, communications services manager 174 includes software for receiving a periodic data signal, modulating the signal using frame gaps, and communicating the modulated signal over a wireless communication system voice channel.

Communication services manager 174 receives service-preference requests for a variety of services from the client via computer 150, web-hosting portal 160, and land network 144. Communication services manager 174 transmits user-preference and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicates with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to telematics unit 120 within mobile vehicle 110 from call center 170. In one embodiment, the call is routed to telematics unit 120 from call center 170 via land network 144, communication network 142, and wireless carrier system 140.

In one embodiment, system 100 utilizes a network transmission standard such as, for example a Code Division Multiple Access (CDMA) transmission standard. In other embodiments, the system utilizes network transmission standards such as, for example Time Division Multiple Access (TDMA), Frequency Division Multiple Access, or Groupe Speciale Mobile (GSM) also referred to as Global System for Mobile (GSM) communication.

FIG. 2 is a block diagram illustrating a system 200 for modulating a periodic data signal in accordance with the present invention. FIG. 2 shows a signal control device 210 that receives a periodic data signal in the form of a protocol transmission $S_{in}(t)$ (detailed in FIG. 3) and a control signal $C(t)$, and produces an altered protocol transmission $S_{out}(t)$ (detailed in FIG. 4). In one embodiment, signal control device 210 is implemented as a digital signal processor as is known in the art.

In an example, signal control device 210 modulates the protocol transmission $S_{in}(t)$ by inserting a predetermined silence period at timed intervals to produce the altered protocol transmission $S_{out}(t)$. In this example, inserting the predetermined silence period at timed intervals is accomplished responsive to the control signal $C(t)$. As noted above, the predetermined silence periods are referred to as frame gaps.

Figure 3:
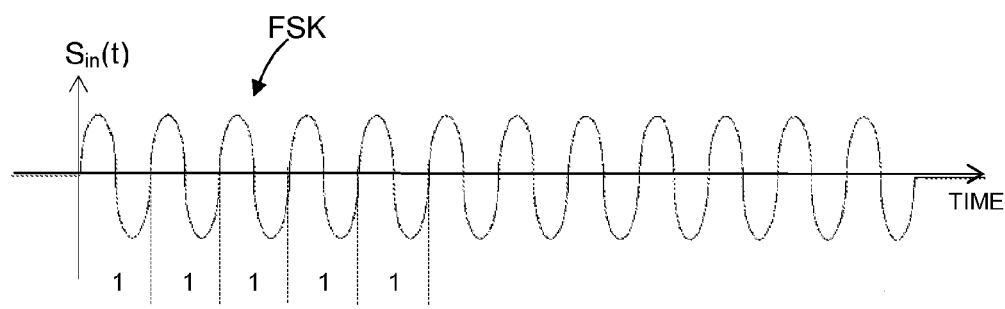
FIG. 3 is a waveform diagram of an unaltered protocol transmission.

FIG. 3 is a waveform diagram of protocol transmission $S_{in}(t)$. In an example, protocol transmission $S_{in}(t)$ is a periodic data signal such as, for example, a calling tone for data link establishment. In another example, the protocol transmission $S_{in}(t)$ is a data sequence modulated through frequency shift keying.

Figure 4:
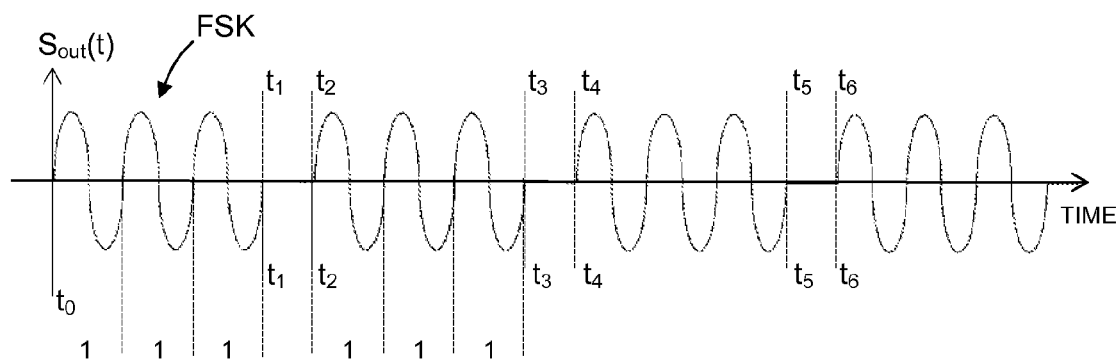
FIG. 4 is a waveform diagram of the altered protocol transmission, in accordance with the present invention.

FIG. 4 is a waveform diagram of the modulated protocol transmission $S_{out}(t)$ including time indices that are presented for illustrative purposes and are not intended to be limiting. In FIG. 4, time index $(t_0-t_6)$ represents a specific time increment of altered protocol transmission $S_{out}(t)$. Time index $(t_0-t_1)$ represents a time increment when control signal $C(t)$ instructs signal control device 210 to pass a portion of protocol transmission $S_{in}(t)$, a protocol transmission period, to the output of signal control device 210. Time index $(t_1-t_2)$ represents a time increment when control signal $C(t)$ instructs signal control device 210 to pass a silence period to the output of control device 210. The combination of the protocol transmission period and the silence period results in the production of altered protocol transmission $S_{out}(t)$ as illustrated in FIG. 4.

The silence periods $(t_1-t_2)$, $(t_3-t_4)$, and $(t_5-t_6)$ created by signal control device 210 based on received input from control signal $C(t)$ are periodic and of a predetermined length. The protocol transmission periods $(t_0-t_1)$, $(t_2-t_3)$, and $(t_4-t_5)$ created by signal control device 210 based on received input from control signal $C(t)$ are periodic and of a predetermined length. In an example, the silence periods ($t_1$-$t_2$), ($t_3$-$t_4$), and ($t_5$-$t_6$) created by signal control device 210 have a duration from about 25 millisecond to about 1000 millisecond. In this example, protocol transmission periods ($t_0$-$t_1$), ($t_2$-$t_3$), and ($t_4$-$t_5$) created by signal control device 210 have a duration from about 1 second to about 3 seconds. In operation, the altered protocol transmission $S_{out}(t)$ provides a discontinuous modulated data signal for transmission over a voice channel of a wireless communication system. The periodic silence periods within altered protocol transmission $S_{out}(t)$ allow the wireless communication system to overcome problems inherent within wireless communication systems such as, for example, a wireless communication system's vocoder identifying an unaltered protocol transmission $S_{in}(t)$ as noise and initiating a noise reduction algorithm to attenuate the protocol transmission $S_{in}(t)$.

Figure 5:
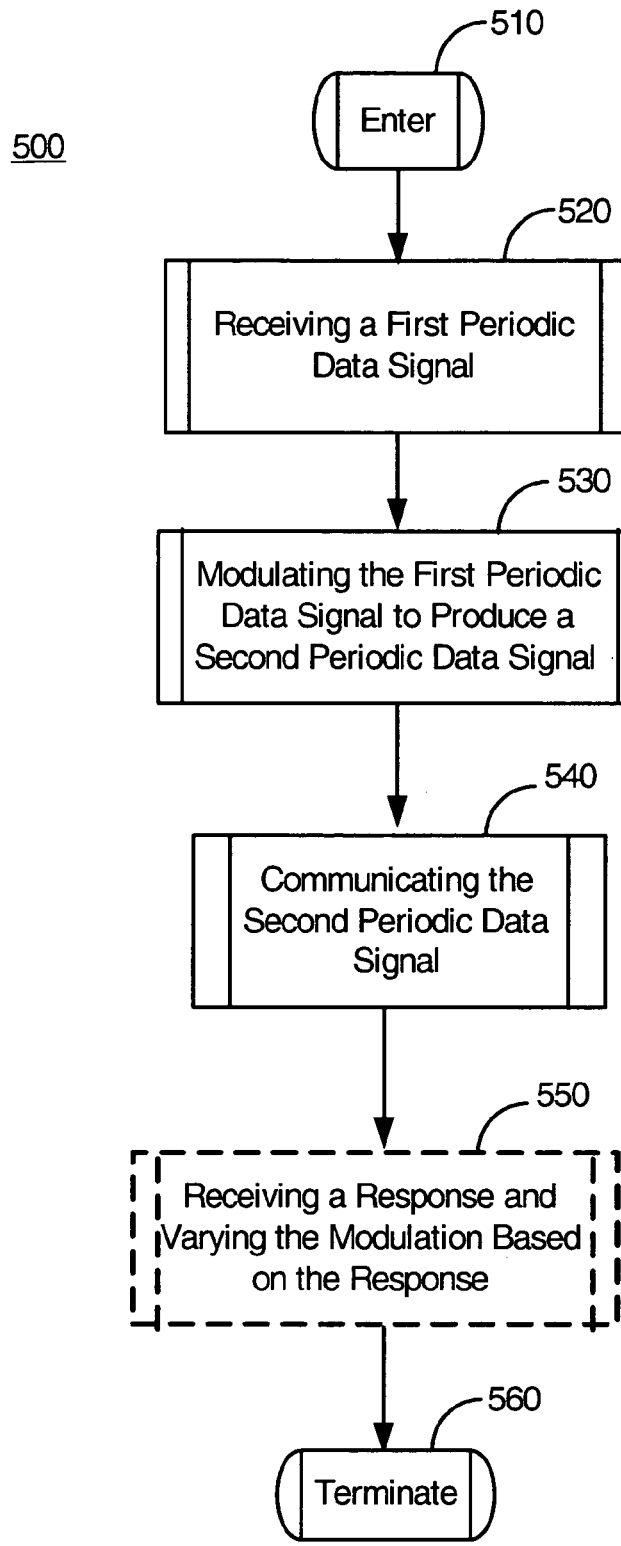
FIG. 5 is a flow diagram of one embodiment of a method of communicating data over a voice channel of a wireless communication system utilizing frame gaps, in accordance with the present invention.

FIG. 5 is a flow diagram of one embodiment of a method of communicating data over a voice channel of a wireless communication system. In FIG. 5, method 500 may utilize one or more systems and concepts detailed in FIGS. 1-4, above. The present invention can also take the form of a computer usable medium including a program for configuring an electronic module within a vehicle. The program stored in the computer usable medium includes computer program code for executing the method steps described in FIG. 5. In FIG. 5, method 500 begins at step 510.

At step 520, a first periodic data signal is received. In one embodiment, the first periodic data signal is received at a signal control device. In an example and referring to FIGS. 2 and 3 above, the first periodic data signal is a protocol transmission $S_{in}(t)$ that is received at signal control device 210. In another embodiment, the first periodic data signal is a data sequence modulated through frequency shift keying.

At step 530, the first periodic data signal is modulated to produce a second periodic data signal. The modulation includes inserting a predetermined silence period (the period being, for example, from about 25 milliseconds to about 1000 milliseconds) at timed intervals into the first periodic data signal to produce the second periodic data signal. In one embodiment, the first periodic data signal is modulated to produce the second periodic data signal by utilizing a control signal to insert the predetermined silence period at periodic intervals into the first periodic data signal. In an example and referring to FIG. 2, the step of modulation includes signal control device 210 receiving a control signal C(t) that includes parameters for a length of the predetermined silence period and timing of the periodic intervals. In this example, signal control device 210 modulates the first periodic data signal responsive to the received control signal and produces the second periodic data signal. In another embodiment and detailed in step 550 below, the predetermined silence period utilized in the modulation is variable.

At step 540, the second periodic data signal is communicated over the voice channel of the wireless communication system. The system utilizes network transmission standards such as, for example Time Division Multiple Access (TDMA), Frequency Division Multiple Access, or Groupe Speciale Mobile (GSM) also referred to as Global System for Mobile (GSM) communication. In one embodiment, the second periodic data signal is a first component of an initial data link authentication process. In another embodiment, communicating the second periodic data signal over the voice channel of the wireless communication system includes transmitting the second periodic data signal over the voice channel of the wireless communication system, receiving the second periodic data signal at a transceiver, and receiving a third periodic data signal from the transceiver. In this embodiment, the third periodic data signal is a second component of an initial data link authentication process.

At optional step 550, the received response is utilized as a basis for varying the modulation of step 530, above. Varying the modulation includes varying the predetermined silence period length responsive to the response received in step 540, above.

In an example and referring to FIGS. 2-4 above, if a predetermined silence period length is not great enough to allow a wireless communication system's vocoder to correctly identify an altered protocol transmission $S_{out}(t)$, the length of the predetermined silence period can be increased until the altered protocol transmission $S_{out}(t)$ is properly identified.

At step 560, the method is terminated.

The above-described methods and implementation for initiating data over voice channel wireless communication utilizing frame gaps are example methods and implementations. These methods and implementations illustrate one possible approach for initiating data over voice channel wireless communication utilizing frame gaps. The actual implementation may vary from the method discussed. Moreover, various other improvements and modifications to this invention may occur to those skilled in the art, and those improvements and modifications will fall within the scope of this invention as set forth in the claims below.

The present invention may be embodied in other specific forms without departing from its spirit or essential characteristics. The described embodiments are to be considered in all respects only as illustrative and not restrictive.

What is claimed is:

1. A method of communicating data over a voice channel of a wireless communication system, comprising the steps of:
   generating a periodic data signal modulated with data and periods of silence, wherein the periods of silence comprise gaps in the data during which no modulation occurs; and
   sending the periodic data signal as a voice communication through a vocoder and over a voice channel of a wireless communication system.

2. The method of claim 1, wherein the wireless communication system is a cellular network.

3. The method of claim 1, wherein the network transmission standard is CDMA, TDMA, or GSM.

4. The method of claim 1, wherein the generating step further comprises generating the periodic data signal with a data sequence using frequency shift keying.

5. The method of claim 1, wherein the duration of each of the periods of silence is within the range of about 25 milliseconds to about 1000 milliseconds.

6. The method of claim 1, wherein the generating step further comprises receiving a first periodic data signal and producing a second periodic data signal by modulating the first periodic data signal with the periods of silence.

7. The method of claim 6, wherein producing the second periodic data signal further comprises the steps of:
   receiving a control signal, the control signal supplying parameters for a length of the periods of silence and timing between the periods of silence; and
   producing the second periodic data signal by modulating the first periodic data signal based on the received control signal.

8. The method of claim 1, wherein the length of the periods of silence are variable.

9. The method of claim 8, further comprising the steps of:
   receiving a response to the periodic data signal over the voice channel of the wireless carrier network; and varying the length of the periods of silence based on the response.

10. A method of communicating data over a voice channel of a wireless communication system, comprising the steps of:
establishing a cellular voice call over a voice channel of a wireless communication system using a selected network transmission standard;
generating a periodic data signal modulated with (i) data using frequency shift keying and (ii) periods of silence during which no frequency shift keying modulation occurs; and
sending the periodic data signal to a call center over the voice channel of the wireless communication system, whereby the periodic data signal is sent over the wireless communication system using a carrier signal that is transmitted during portions of the periodic data signal that contain the data and during portions of the periodic data signal that contain the periods of silence.

11. The method of claim 10, further comprises the steps of:
(a) generating the periodic data signal using frequency shift keying; and
(b) modulating the periodic data signal with periods of silence that are added at the periodic time intervals.

12. The method of claim 11, wherein step (a) is carried out prior to step (b).

13. The method of claim 10, wherein the network transmission standard is CDMA, TDMA, or GSM.

14. The method of claim 10, wherein the periods of silence comprise frame gaps.

15. A method of communicating data over a voice channel of a wireless communication system, comprising the steps of:
generating a data signal that includes modulated data and periods of silence during which the data signal is unmodulated; and
sending the data signal as a voice communication over a voice channel of a wireless communication system.

16. The method of claim 15, wherein the wireless communication system is a cellular network.

17. The method of claim 15, wherein the network transmission standard is CDMA, TDMA, or GSM.

18. The method of claim 15, wherein the generating step further comprises generating the data signal with a data sequence using frequency shift keying.

19. The method of claim 15, wherein the duration of each of the periods of silence is within the range of about 25 milliseconds to about 1000 milliseconds.

20. The method of claim 15, wherein the generating step further comprises receiving a first periodic data signal and producing a second periodic data signal by modulating the first periodic data signal with the periods of silence.

21. The method of claim 20, wherein producing the second periodic data signal further comprises the steps of:
receiving a control signal, the control signal supplying parameters for a length of the periods of silence and timing between the periods of silence; and
producing the second periodic data signal by modulating the first periodic data signal based on the received control signal.

22. The method of claim 15, wherein the length of the periods of silence are variable.

23. The method of claim 22, further comprising the steps of:
receiving a response to the data signal over the voice channel of the wireless carrier network; and
varying the length of the periods of silence based on the response.

* * * * *